(12) United States Patent
Candy

(10) Patent No.: US 6,636,044 B2
(45) Date of Patent: Oct. 21, 2003

(54) GROUND MINERALIZATION REJECTING METAL DETECTOR (RECEIVE SIGNAL WEIGHTING)

(75) Inventor: Bruce Halcro Candy, Basket Range (AU)

(73) Assignee: BHC Consulting PTY Ltd., Glenside (AU)

(*) Notice: Subject to any disclaimer, the term of this patent is extended or adjusted under 35 U.S.C. 154(b) by 0 days.

(21) Appl. No.: 09/978,210

(22) Filed: Oct. 17, 2001

(65) Prior Publication Data

US 2002/0053908 A1 May 9, 2002

(30) Foreign Application Priority Data

Oct. 17, 2000 (AU) .............................................. PR0836

(51) Int. Cl.[7] .......................... G01V 3/11; G01V 3/165; G01V 3/38

(52) U.S. Cl. ...................................... 324/329; 324/336

(58) Field of Search ................................ 324/225, 239, 324/329, 334–337

(56) References Cited

U.S. PATENT DOCUMENTS

| 5,537,041 A | 7/1996 | Candy |
| 5,576,624 A | 11/1996 | Candy |
| 6,326,791 B1 * | 12/2001 | Bosnar ........................ 324/329 |

* cited by examiner

Primary Examiner—Gerard R. Strecker
(74) Attorney, Agent, or Firm—Finnegan, Henderson, Farabow, Garrett & Dunner, L.L.P.

(57) ABSTRACT

Metal detection apparatus wherein a transmit coil will transmit magnetic pulses, and the processing circuitry will weight a receive signal more heavily soon after a transmit pulse transition and less heavily after a longer period following the transmit pulse transition.

2 Claims, 2 Drawing Sheets

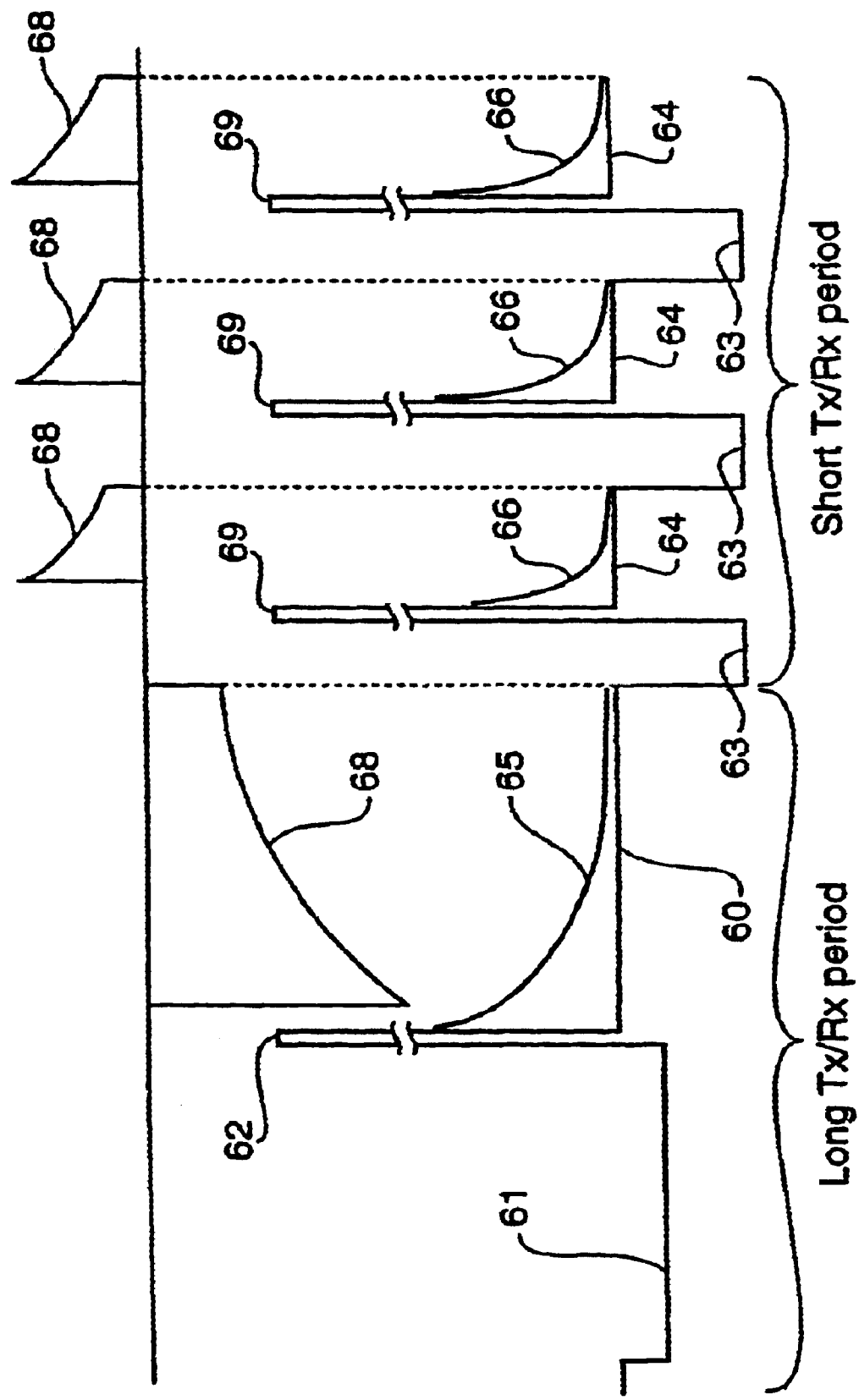

GROUND MINERALIZATION REJECTING METAL DETECTOR (RECEIVE SIGNAL WEIGHTING)

BACKGROUND

In U.S. Pat. Nos. 5,537,041 and 5,576,624 I disclosed a metal detector apparatus which is capable of substantially reducing signals arising from ground mineralisation containing magnetic soils. Several models utilizing these principles have been commercialised and used highly successfully by gold prospectors and for land mine detection. Whilst the improvement compared to other extant metal detectors was considerable, further improvements relating to improved signal-to-noise ratio are disclosed herein which results in detection greater depth; a requirement for both prospectors and land-mine de-miners.

In U.S. Pat. No. 5,576,624 I disclosed a metal detector apparatus which transmits a pulse induction waveform and in U.S. Pat. No. 5,537,041 a rectangular voltage waveform applied to a transmit coil.

The advantages of pulse sequence containing pulses of different duration are disclosed. The historic (loss) received signal response from magnetic soils is approximately the same for all such soils (except for the overall amplitude). The instantaneous (conservative reactive) magnetic soil component is directly proportional to the transmit signal component.

In contrast the historic and instantaneous response from metal targets vary substantially.

Hence if a proportion of one part of the received signal is subtracted from a linear combination of a different part of the received signal, it is possible to select the coefficients of the said linear combination such that the response from magnetic soils are cancelled. In general, a particular said linear combination resulting in magnetic soil signal cancellation, a fist linear combination, will not result in cancellation of most metal targets, except for some particular metal targets with a particular or specific eddy current time constant decay, a first eddy current decay time constant, which happens to also result in a zero first linear combination result.

In order to detect targets with the said first eddy current decay time constant, a different linear combination of different sampled receive signals, a second linear combination, is required to cancel magnetic soil response and not cancel the said first eddy current time constant decay signal. Likewise the said second linear combination will cancel a particular metal eddy current decay signal, a second eddy current time constant decay, which will not be cancelled by the said first linear combination if chosen appropriately. Thus by simultaneously measuring and calculating at least two different linear combinations, all metal targets may be detected and magnetic soil signals approximately cancelled.

In U.S. Pat. Nos. 5,576,624 and 5,537,041 I disclosed a metal detector apparatus which is insensitive to induced e.m.f. signals from movement of a search coil relative to the earth's magnetic field and magnetic fields from magnetic soils and rocks. This is achieved by selecting the total integrated receive signal over a complete cycle to be zero.

SUMMARY OF THE INVENTION

The problem to which this invention is directed is to improve sensitivity of a metal detector apparatus and it has for its object to provide means to improve the signal-to-noise ratio of a received signal.

In one form of this invention, this can be said to reside in a metal detector apparatus including a transmit coil adapted to transmit a magnetic field when operating with electrical current flowing through the said transmit coil, transmit timing control circuitry, power supplies, and receive signal circuitry and receive signal processing circuitry, a method:

wherein the transmit coil transmits magnetic pulses;

and the processing circuitry accumulate a receive signal which is weighted more heavily soon after the cessation of a transmit pulse and less heavily after a longer period following the cessation of a transmit pulse.

In a further form this invention could be said to reside in a metal detector apparatus of a type including a transmit coil adapted to transmit a magnetic field when operating with electrical current flowing through the said transmit coil, transmit timing control circuitry, power supply means, and receive signal circuitry and receive signal processing circuitry, wherein the transmit coil is arranged to transmit magnetic pulses, and the processing circuitry is adapted to accumulate a receive signal which is weighted more heavily soon after a cessation of a transmit pulse and less heavily after a longer period following the cessation of a transmit pulse.

All historic component signals from metal targets or magnetic soils are known to decay away following cessation of any transmit pulse or transmit signal transition. Thus the signal-to-noise implicitly becomes poorer with time after the cessation or transition of a transmit pulse. Therefore improved signal-to-noise ratio may be achieved by weighting the linear combinations greatest soon after the cessation of the transmit pulse and the weighting reduces with time.

BRIEF DESCRIPTION OF THE DRAWINGS

For a better understanding of this invention reference will now be made to an embodiment which shall now be described with the assistance of drawings wherein:

FIG. 2 is an example of a transmit waveform capable of being transmitted by the circuit of FIG. 1 together with an example of a receive signal and an example of a weighting function.

DESCRIPTION OF THE PREFERRED EMBODIMENT

Figure 1:
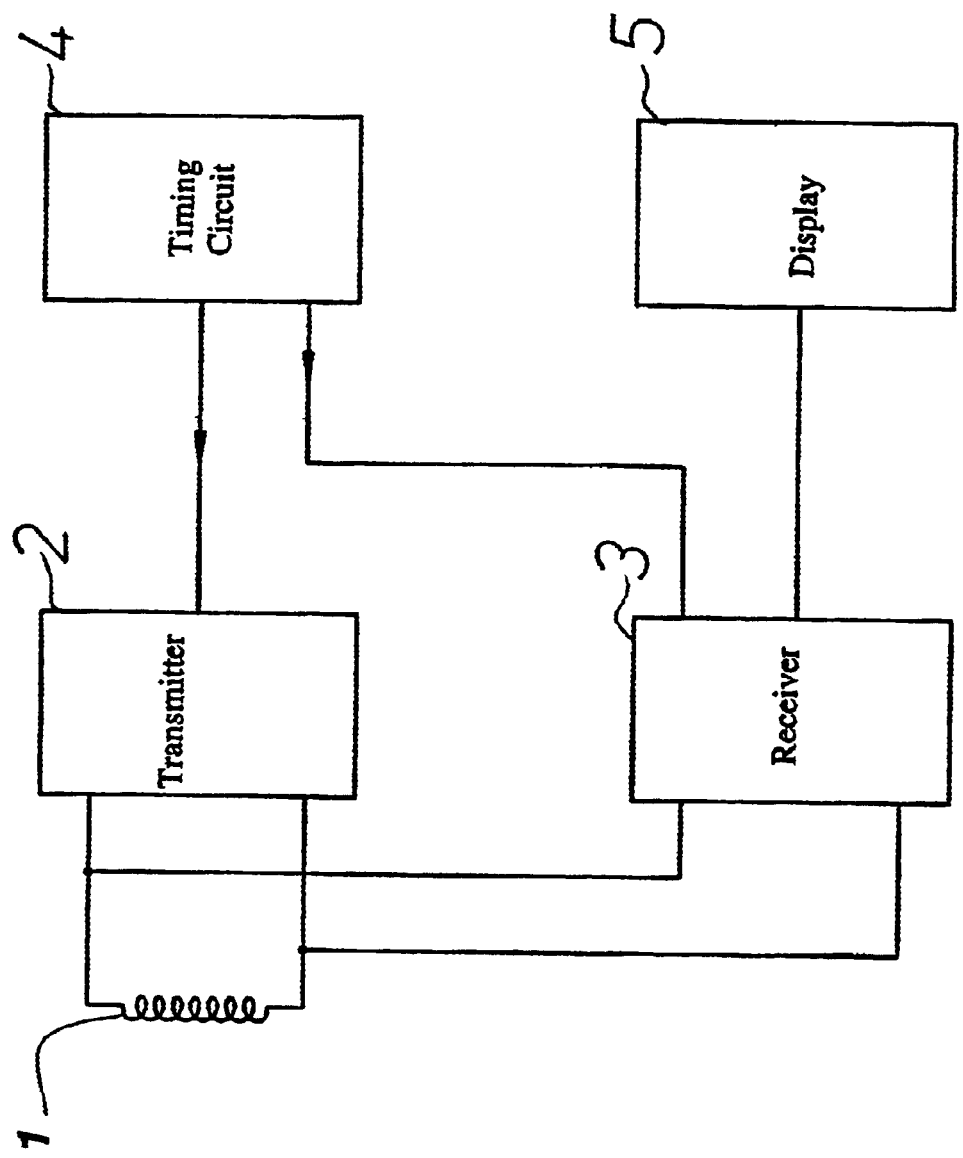
FIG. 1 is an example of a new pulsed metal detector apparatus which includes a transmit and receive coil, transmit and receive electronics, timing circuitry and receive signal weighting.

FIG. 1 shows an example of a preferred embodiment. In FIG. 1, a pulsed transmit signal is generated in an electronic transmitter source 2. An inductive coil 1 acts as a magnetic transmitter and receiver, and is connected to 2. Coil 1 is also connected to receive electronic circuitry 3, which includes electronic processing. The timing clock signals for 2 and 3 are generated in electronic timing logic circuitry 4. An output of 3 is connected to further electronic processing and indicator means 5.

Receive electronics 3 includes means to weight or bias the receive signal by means of a weighting function which is a function of time relative to the timing signals applied to 3 which is generated in 4.

At the time of this application this may be best achieved by using digital signal processing electronics, wherein the received signal from 1 may first be passed to a transmit (receive switch, and then amplified by an operational amplifier whose output is fed to a digital-signal-processing integrated circuit, which includes an analogue-to-digital-converter. The resulting digital signal received signal is then multiplied by the weighting function and then averaged or low pass filtered.

FIG. 2 shows an example of transmit and receive signals, and a weighting function which could be generated within the components shown in FIG. 1.

The signal 61-62-60-63-69-64 is the transmit voltage waveform applied across the coil 1 in this example. Periods 60 and 64 are periods of no transmission, and periods of reception when the coil 1 acts as a receive coil. Thus the voltage across the coil during this period is very small and an amplified version on a different scale is shown as 65 and 66. For the purposes of further example, period 61 may be of the order of milliseconds and of the order of a few volts. Period 60 is similar to 61 and 64 substantially shorter as illustrated. The voltage during period 63 is of the order of tens of volts and the voltage during periods 62 and 69 are of the order of hundreds of volts and are of the order of microseconds duration. Both 61 and 63 are periods of magnetically energising coil and periods 62 and 69 are periods of magnetic collapse. The receive signals arise from resultant magnetic signal decays from the environment under the influence of the transmit field of the coil. Signals may also be received during transmission, for example, if the sensing magnetic coil has a separate transmit and receive coil which are electrically nulled with respect to each other. The optimal signal-to-noise ratio is attained when the weighting function is biased most strongly soon after transmit coil signal transitions, and less heavily as time progresses until the next transmit signal transition. This is in fact the same criteria as the case with the zero transmission reception example above.

An example of a weighting function to improve post low pass filtering or averaging signal-to-noise ratio is given as 68 in FIG. 2 which decays away with worsening instantaneous signal-to-noise ratio. Note that, as shown in this example, the contribution following the long pulse is of opposite sign to that from the short pulses, and also that different decay time constant targets have different associated weighting functions for optimally improved signal-to-noise ratios for both magnetic soil rejection and target discrimination.

The example given in these figures is that of a pulse induction metal detector. Receive signal weighting functions may also be beneficial for post low pass filtering (and demodulation) signal-to-noise ratio for other types of transmit waveforms. For example, rectangular transmit waveforms. Such weighting functions may be selected for enhanced discrimination for different target time constants and or ferrous discrimination. For example, suppose a particular land mine is to be detected, and a particular metal target rejected, as well as ground mineralization, for a given transmit waveform. Mathematically, there will be an optimum weighting function for optimal signal-to-noise ratio to achieve this objective.

The claims defining the invention are as follows:

1. In a metal detector apparatus including a transmit coil or a transmit/receive coil adapted to transmit magnetic field pulses when operating with electrical current flowing through the coil, transmit and receive timing control circuitry controlling the electrical current flowing through the coil, power supplies, and receive signal circuitry and receive signal processing circuitry coupled to the coil, a method comprising the steps of:

transmitting magnetic pulses via the coil; and accumulating a receive signal received by the coil in the processing circuit coupled to the coil; wherein
        said receive signal is weighted more heavily after a transmit pulse transition and less heavily after a longer period following the transmit pulse transition.

2. A metal detector apparatus of a type including a transmit coil or a transmit/receive coil adapted to transmit magnetic field pulses when operating with electrical current flowing through the coil, transmit and receive timing control circuitry controlling the electrical current flowing through the coil, power supply means, and receive signal circuitry and receive signal processing circuitry coupled to the coil, wherein the coil is arranged to transmit magnetic pulses, and the processing circuitry is adapted to accumulate a receive signal which is weighted more heavily soon after a transmit pulse transition and less after longer following the transmit pulse transition.

* * * * *

UNITED STATES PATENT AND TRADEMARK OFFICE
CERTIFICATE OF CORRECTION

PATENT NO. : 6,636,044 B2
DATED : October 21, 2003
INVENTOR(S) : Bruce Halcro Candy It is certified that error appears in the above-identified patent and that said Letters Patent is hereby corrected as shown below:

<u>Column 4,</u>
Line 40, "less after longer following" should read -- less heavily after a longer period following --.

Signed and Sealed this

Seventh Day of September, 2004

JON W. DUDAS
*Director of the United States Patent and Trademark Office*